Patented Sept. 6, 1949

2,480,823

UNITED STATES PATENT OFFICE 2,480,823

PREPARATION OF METAL DERIVATIVES OF ORGANIC COMPOUNDS CONTAINING A REPLACEABLE HYDROGEN

John R. Morris, Lawrenceville, Ill., and Joseph E. Fields, Dayton, Ohio, assignors to The Texas Company, New York, N. Y., a corporation of Delaware No Drawing. Application April 23, 1947, Serial No. 743,462

9 Claims. (Cl. 252—42.7)

This invention relates to the preparation of metal derivatives of organic compounds containing a replaceable hydrogen by reacting the organic compound with an inorganic metal salt in liquid ammonia.

This is a continuation-in-part of our copending application Serial No. 480,860 filed March 27, 1943, now abandoned.

Among the recently developed methods of preparing metal derivatives of organic compounds described in the literature is the reaction of a solution of a metal in liquid ammonia with an organic compound containing a replaceable hydrogen. The mechanics of this reaction have not been definitely established, but the success thereof is dependent upon the solubility of the desired metal in liquid ammonia. The alkali and alkaline earth metals are the only metals known to be freely soluble, but certain metals, such as beryllium, zinc, aluminum, gallium, lanthanum, cerium and manganese, although only slightly soluble, are sufficiently soluble in liquid ammonia for the purposes of the reaction. Although this reaction has been successfully applied to the preparation of metal derivatives normally difficult to prepare by the classical methods of synthesis, it possesses certain disadvantages which render it uneconomical for adaptation to commercial processes. Among these disadvantages is the expense involved and the difficulty in handling a pure metal. Furthermore, incidental to this reaction, the metallic solutions react as reducing agents. In the case of organic compounds containing some unsaturation in the molecule, this reaction, while resulting in the metal derivatives, will simultaneously cause a reduction of the unsaturated constituents.

According to the present invention a method of preparing metal derivatives of organic compounds containing a replaceable hydrogen has been found which does not result in a reduction of the organic compound and in which the materials used are more economical and are not as difficult to handle as in the aforementioned reaction. It has been discovered that a metal derivative of an organic compound containing a replaceable hydrogen may be obtained by the reaction of an inorganic metal salt in liquid ammonia. These metal salts may take the form of halides, nitrates, metal ammonium halides, metal ammonium sulfates, etc., or any inorganic acid salt which is sufficiently soluble in liquid ammonia for the purposes of this reaction. Of the various metal salts which can be used the metal halides and particularly the metal chlorides and metal ammonium chlorides are preferred.

It is to be understood that whenever the terms "solubility" or "solution of an inorganic metal salt in liquid ammonia," or other terms implying the same, are used in the description of the reaction and in the claims, the interpretations given thereto should include that degree of solubility necessary for the operation of the reaction.

This reaction may be advantageously carried out in the presence of a solvent substantially immiscible with liquid ammonia. The function of this solvent is to remove the reaction product, namely, the metal derivative, from the reaction zone as it is formed. In this manner the reaction goes to completion instead of remaining in a state of equilibrium due to the hydrolyzing effect of the acids formed in the reaction. In general, the particular solvent used in the reaction depends upon the type of starting material and the final product expected. Among the solvents which have been found effective are toluene, benzene, hexane, xylene, ethyl benzene and ethyl ether.

As previously mentioned, this reaction may be applied to any organic compound having at least one —OH or —SH radical containing a replaceable hydrogen. This category of compounds includes any organic compound containing one or more of the groups:

—OH        —COSH
—SH        —CSSH
—COOH      —PSSH such as aromatic or aliphatic alcohols or thio-alcohols, aromatic or aliphatic carboxylic acids or thio-carboxylic acids, organic phosphonic acids, and substituted compounds of the foregoing types containing at least one —OH or —SH radical.

The metal salts which have been found to take part in this reaction are those of the metals falling just above and below hydrogen in the electromotive series of elements, including tin, lead, iron, antimony, bismuth and arsenic. The salts of tin, antimony, bismuth and arsenic react almost quantitatively with excellent recovery of these metal derivatives. The ferric salts appear to react more readily than the ferrous salts, although the recovery of the ferric or ferrous derivatives has not been quantitative and in some cases only about half or less of theoretical. The lead salts appear to be the most difficult to react, with the yields obtained being still lower.

In the preferred order of reaction a solution of the desired metal salt in liquid ammonia is prepared and to this solution are added small increments of a solution of the organic compound in the organic solvent immiscible in liquid ammonia. The reaction mixture is agitated and continued in the agitated state for a period after all the organic compound has been added. The liquid ammonia is then allowed to evaporate. The reaction mass is then filtered and stripped of the solvent leaving the desired metal derivative.

The following specific examples are given as illustrations of the method and technique which may be applied to any of the reactions of the present invention. The organic compound containing a replaceable hydrogen used in the first three examples, namely, cardanol, is a phenol containing an unsaturated alkyl group in the meta position. This compound, which is obtained from cashew nut shell oil, is normally very unstable and subject to polymerization reactions:

Example I 110 grams (0.55 mol) of anhydrous stannous chloride were dissolved in 2 liters of liquid ammonia and resulted in a greenish yellow solution. The solutions of the inorganic metal salts in liquid ammonia usually possess a characteristic color. 300 grams (approximately 1 mol) of cardanol ($C_{20}H_{32}O$) were dissolved in 1 liter of toluene, and the solution added drop-wise to the solution of the metallic salt in liquid ammonia while vigorously stirring. After the addition of all the cardanol, the stirring was continued for two to three hours. The residual ammonia was allowed to evaporate overnight. Additional toluene was then added, and the reaction mixture heated, filtered, and the solvent removed by stripping in vacuo. Prior to the removal of the solvent, sufficient mineral lubricating oil was added to produce a 50% by weight concentrate of the final product. The resulting product, namely, the 50% oil concentrate of the stannous salt of cardanol, analyzed 10.4% $SnO_2$ against a theoretical value of 10.8%.

Example II 76 grams of antimony chloride were dissolved in 3½ liters of liquid ammonia and a toluene solution of 290 grams of cardanol ($C_{20}H_{32}O$) was added. The reaction mixture was vigorously agitated for 8 hours. After standing over night the reaction mixture was heated, filtered, lubricating oil added, and the solvent removed by stripping in vacuo. The resulting 50% oil concentrate of antimony cardanate analyzed 7.9% antimony.

Example III 79 grams of bismuth chloride were dissolved in 2½ liters of liquid ammonia and a toluene solution of 290 grams of cardanol ($C_{20}H_{32}O$) in 500 ccs. of toluene was added. The reaction mixture was stirred for 8 hours and, after standing over night, was heated, filtered, lubricating oil added, and the solvent removed by stripping in vacuo. The resulting 50% oil concentrate of bismuth cardanate analyzed 7.4% bismuth as against a theoretical value of 9.8%.

A similar procedure using arsenic chloride gives a comparable yield of arsenic cardanate.

Example IV 113 grams of $SnCl_2.2H_2O$ were heated until anhydrous and dissolved in 2 liters of liquid ammonia. A solution of 275 grams of diamyl phenoxy ethanol in 300 ccs. of toluene was added slowly with stirring. After standing overnight the reaction mixtures were heated, filtered and stripped of solvent. The resulting stannous diamyl phenoxy ethylate analyzed 15.4% $SnO_2$.

Example V 10 grams of anhydrous stannous chloride were dissolved in 1 liter of liquid ammonia and a solution of 50 grams of diamylphenoxyethyl salicylate in 150 ccs. of toluene was added while stirring. The stirring was maintained for three hours after which the ammonia was allowed to evaporate overnight without stirring. Thereafter 500 ccs. of toluene were added and the reaction product was filtered. The solvent was stripped off under vacuum and lubricating oil added to the reaction product. The resulting 50% oil concentrate of the tin salt of diamylphenoxyethyl salicylate possessing the following formula analyzed 6.7% tin.

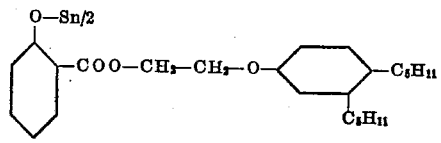

Example VI 18.9 grams of anhydrous stannous chloride were dissolved in 1 liter of liquid ammonia and a solution of 80 grams of diamylphenoxyethyl thiosalycylate in toluene was added while stirring. The stirring was maintained for three hours; afterwards the ammonia was allowed to evaporate over night. Thereafter additional toluene was added and the reaction product filtered and stripped of solvent. The reaction product, which weighed 66 grams, was then dissolved in 66 grams of 300 pale oil to give a 50% concentrate which analyzed 7.2% tin.

Example VII

A high molecular weight alkyl thiophenol was prepared from an alkyl benzene sodium sulfonate having a molecular weight of 833 by reaction with a toluene solution of $POCl_3$ to produce the high molecular weight alkyl benzene sulfonyl chloride, according to the equation $$2R-SO_3Na + POCl_3 \rightarrow 2R-SO_2Cl + NaCl + NaPO_3$$

The resulting toluene solution of the sulfonyl chloride was then filtered from the sodium chloride and sodium phosphate. The residue, after removal of solvent and $POCl_3$, was reduced with metallic zinc and $H_2SO_4$ according to the equation $$R-SO_2Cl + 6H \rightarrow RSH + HCl + 2H_2O$$

wherein R represents the alkyl aryl nucleus, and RSH the resulting alkyl thiophenol. This material was a viscous liquid which would not distill at a temperature of 300° C. under 1 mm. absolute pressure.

The tin salt of this alkyl thiophenol was then prepared in the following manner. 60 grams of anhydrous stannous chloride were dissolved in three liters of liquid ammonia, and a solution of 375 grams of the aforementioned alkyl thiophenol dissolved in 500 cc. of toluene, was added in less than one hour with stirring. 200 cc. more toluene were added, and the mixture was then stirred for two hours, after which the ammonia was evaporated overnight. The reaction mixture was filtered, and the filtrate heated on a steam bath at reduced pressure to strip off the toluene. 388 grams of viscous liquid product were obtained, which had a specific gravity of 1.025/85° F., an ash content of 9.63%, a sulphur content of 3.04%, and formed a clear solution in mineral lubricating oil in concentrations up to 50% by weight.

The said tin alkyl thiophenolate could not be prepared by the conventional alkali metal-alcohol-metal halide method, apparently due to oxidation to disulfides. Since oxidizing conditions were entirely absent in the foregoing method of preparation, the desired tin salt was obtained in satisfactory yield.

*Example VIII*

A high molecular weight C13–C14 alkyl mercaptan having a boiling range of 205–260° F. at 1 mm. absolute pressure and analyzing 16.1% by weight of sulphur was converted to the alkyl tin mercaptide in the following manner. 50 grams of anhydrous stannous chloride were mixed with 500 cc. liquid ammonia. A mixture of 85 grams of the said alkyl mercaptan in 200 cc. of toluene was added in one-half hour with stirring, and agitation was continued for 2½ hours. The ammonia was then allowed to evaporate overnight, and the reaction mixture filtered and filter cake washed with toluene. The solvent was then removed from the filtrate by distillation at reduced pressure. 107 grams of the alkyl tin mercaptide were obtained, the product being a yellow opaque viscous mass, which became gelatinous on cooling, having an ash content of 29.4% by weight, equivalent to a tin content of 19.1%.

Here again, the tin salt of the alkyl mercaptan could not be prepared by the conventional alkali metal-alcohol-metal halide method due to oxidation to disulfides.

*Example IX*

An alkyl phenol was prepared by alkylating a butylene polymer gasoline fraction having a boiling range of 362–439° F. with phenol in the presence of anhydrous aluminum chloride catalyst. The resulting over-all product had a boiling range of 130–230° C. at 1 mm. absolute pressure, an average molecular weight of 320, a hydroxyl number of 129 and a density of 0.939.

The lead salt of the said alkyl phenol was prepared in the following manner. 17 grams of lead nitrate were dissolved in 1000 cc. of liquid ammonia. 45 grams of the said alkyl phenol dissolved in 100 cc. of toluene were added dropwise with stirring over a period of 20 minutes, and agitation was continued for three hours. The ammonia was evaporated by overnight standing without agitation, the reaction product filtered and the solvent stripped from the filtrate. 42.5 grams of a liquid product analyzing 1.23% by weight of lead were obtained.

*Example X*

11.5 grams of ferric ammonium chloride calculated as Fe₂Cl₆·4NH₄Cl·2H₂O were dissolved in 600 cc. of liquid ammonia. 27 grams of the alkyl phenol employed in Example IX dissolved in 100 cc. of toluene were added with stirring over a period of twenty minutes. Stirring was continued for three hours and then the ammonia was evaporated on standing overnight. The residue was diluted with 100 cc. of toluene, triturated in a mortar and filtered. Following stripping of the solvent from the filtrate, 25 grams of a liquid product comprising the ferric salt of the alkyl phenol and analyzing 1.49% by weight of iron was obtained.

A similar run was made employing ferrous ammonium sulfate in place of the ferric ammonium chloride, but in this case a smaller yield of the ferrous salt of the alkyl phenol was secured.

Obviously, many modifications and variations of the invention, as hereinbefore set forth, may be made without departing from the spirit and scope thereof, but only such limitations should be imposed as are indicated in the appended claims.

We claim:

1. A method of preparing a metal derivative of an organic compound which comprises reacting a solution in an organic solvent of an organic compound containing at least one radical selected from the group consisting of —OH and —SH with a solution of an inorganic metal salt in liquid ammonia, said inorganic metal salt being selected from the group consisting of the salts of tin, lead, iron, antimony, bismuth and arsenic which are soluble in liquid ammonia, said organic solvent being immiscible with liquid ammonia, and the resultant metal derivative of the organic compound being preferentially soluble in said organic solvent and recoverable as a solution in said solvent.

2. A method of preparing metal derivatives of organic compounds which comprises reacting an organic compound containing at least one hydroxyl radical, which compounds are inert to liquid ammonia, with a solution of an inorganic metal salt in liquid ammonia, said inorganic metal salt being selected from the group consisting of the salts of tin, lead, iron, antimony, bismuth and arsenic which are soluble in liquid ammonia, in the presence of an organic solvent immiscible with said liquid ammonia and capable of dissolving the metal derivative reaction product, evaporating the liquid ammonia, filtering the resulting solution of metal derivative of the organic compound in the organic solvent, and stripping off the organic solvent.

3. A method of preparing metal derivatives of organic compounds which comprises reacting an organic compound containing at least one sulfhydryl radical, which compounds are inert to liquid ammonia, with a solution of an inorganic metal salt in liquid ammonia, said metal salt being selected from the group consisting of the inorganic salts of tin, lead, iron, antimony, bismuth and arsenic, which are soluble in liquid ammonia, in the presence of an organic solvent immiscible with said liquid ammonia and capable of dissolving the metal derivative reaction product, evaporating the liquid ammonia, filtering the resulting solution of metal derivative of the organic compound in the organic solvent, and stripping off the organic solvent.

4. A method of preparing metal derivatives of aromatic compounds which comprises reacting an aromatic compound containing at least one hydroxyl radical with a solution of an inorganic metal salt in liquid ammonia, said inorganic metal salt being selected from the group consisting of the salts of tin, lead, iron, antimony, bismuth and arsenic which are soluble in liquid ammonia.

5. A method of preparing a metal phenate which comprises reacting a phenol with a solution of a metal halide in liquid ammonia, said metal halide being selected from the group consisting of halides of tin, lead, iron, antimony, bismuth and arsenic, in the presence of an organic solvent immiscible with said liquid ammonia and capable of dissolving the resulting metal phenate.

6. A method of preparing a metal derivative of a phenol having an aliphatic substituent group, which comprises reacting a solution in an organic solvent of the phenol having an aliphatic substituent group with a solution of a metal chloride in liquid ammonia, said metal chloride being selected from the group consisting of the chlorides of tin, lead, iron, antimony, bismuth and arsenic, said organic solvent being immiscible with liquid ammonia, and the resultant metal derivative of the phenol being preferentially soluble in the organic solvent and recoverable as a solution in said solvent.

7. The method according to claim 6, wherein the excess liquid ammonia is evaporated from the reaction mixture, the resulting solution of the metal derivative in the organic solvent filtered, and the solvent stripped to obtain the metal derivative of the said phenol.

8. The method according to claim 7, wherein a mineral lubricating oil is added prior to the solvent stripping step to obtain the metal derivative of the phenol as a concentrate in the mineral lubricating oil.

9. The method according to claim 8, wherein the metal chloride is stannous chloride.

JOHN R. MORRIS.
JOSEPH E. FIELDS.

REFERENCES CITED

The following references are of record in the file of this patent:

UNITED STATES PATENTS

| Number | Name | Date |
| --- | --- | --- |
| 1,875,999 | Gerlach | Sept. 6, 1932 |

FOREIGN PATENTS

| Number | Country | Date |
| --- | --- | --- |
| 293,363 | Great Britain | July 2, 1928 |
| 529,601 | Germany | July 17, 1931 |

OTHER REFERENCES

Audrieth, "Zeit. fur Angew. Chem.," vol. 45 (1932), pages 385–388.

Schmitz-Dumont et al., "Zeit. Anorg. Allgem. Chem.," vol. 224 (1935), pages 62 to 70.

Franklin, "The Nitrogen System of Compounds" (1935), page 24.